United States Patent
Statnikov et al.

(10) Patent No.: US 10,303,737 B2
(45) Date of Patent: May 28, 2019

(54) DATA ANALYSIS COMPUTER SYSTEM AND METHOD FOR FAST DISCOVERY OF MULTIPLE MARKOV BOUNDARIES

(71) Applicants: Alexander Statnikov, New York, NY (US); Konstantinos (Constantin) F. Aliferis, Astoria, NY (US)

(72) Inventors: Alexander Statnikov, New York, NY (US); Konstantinos (Constantin) F. Aliferis, Astoria, NY (US)

(*) Notice: Subject to any disclaimer, the term of this patent is extended or adjusted under 35 U.S.C. 154(b) by 168 days.

(21) Appl. No.: 14/215,782

(22) Filed: Mar. 17, 2014

(65) Prior Publication Data
US 2014/0324752 A1    Oct. 30, 2014

Related U.S. Application Data

(60) Provisional application No. 61/791,654, filed on Mar. 15, 2013.

(51) Int. Cl.
G06F 17/18    (2006.01)

(52) U.S. Cl.
CPC .................... *G06F 17/18* (2013.01)

(58) Field of Classification Search
CPC ......................................... G06F 17/18
See application file for complete search history.

(56) References Cited

PUBLICATIONS

Statnikov, Alexander, Jan Lemeir, and Constantin F. Aliferis. "Algorithms for discovery of multiple markov boundaries." The Journal of Machine Learning Research 14.1 (2013): 499-566.*

* cited by examiner

*Primary Examiner* — Scott A. Waldron
*Assistant Examiner* — Kevin W Figueroa
(74) *Attorney, Agent, or Firm* — Laurence Weinberger

(57) ABSTRACT

Methods for discovery of a Markov boundary from data constitute one of the most important recent developments in pattern recognition and applied data analysis and modeling, primarily because they offer a principled solution to the variable/feature selection problem and give insight about local causal structure. Even though there is always a single Markov boundary of the response variable in faithful distributions, distributions with violations of the intersection property of probability theory may have multiple Markov boundaries. Such distributions are abundant in practical data-analytic applications, and there are several reasons why it is important to discover and extract all Markov boundaries from such data as a critical step of data analysis. The present invention is a novel fast generative method (termed Generalized-iTIE*) that can discover all Markov boundaries from a sample drawn from a distribution. The new method has been tested with simulated data and then applied to discover Markov boundaries in datasets from several application domains including but not limited to: biology, medicine, economics, ecology, image recognition, text processing, and computational biology.

5 Claims, 11 Drawing Sheets

---

Generalized-iTIE*

Input: dataset D (a sample from distribution P) for variables $V$, including a response variable $T$.
Output: multiple Markov boundaries of $T$ that exist in P.

1. Initialization
    a. Initialize an equivalency catalogue $\Theta$ with known information equivalency relations with respect to $T$ or an empty set if no such relations are known
    b. Initialize a seed Markov boundary of $T$ to be: $M \leftarrow S$, s.t. $S \subseteq V \setminus T$
    c. Initialize a priority queue of variables to be examined for inclusion in $M$: OPEN $\leftarrow V \setminus (T \cup M)$ 2. Apply inclusion sub-process
    a. Prioritize variables in OPEN for inclusion in $M$;
    b. Throw away non-eligible variables from OPEN;
    c. Insert in $M$ the highest-priority variable(s) in OPEN and remove them from OPEN 3. Apply elimination/analysis sub-process to remove variables from $M$ and determine and record in the equivalency catalogue $\Theta$ which variable subsets contain equivalent information to the subsets of $M$ 4. Apply interleaving sub-process by repeating steps 2 and 3 until a termination criterion is met 5. Compute the Cartesian product of information equivalence relations for subsets of $M$ that are stored in $\Theta$ to construct multiple Markov boundaries of $T$
6. Output multiple Markov boundaries of $T$.

iTIE*

Input: dataset D (a sample from distribution P) for variables $V$, including a response variable $T$.
Output: multiple Markov boundaries of $T$ that exist in P.

*Phase I: Forward*
1. Initialize $\Theta$ with an empty set
2. Initialize $M$ with an empty set
3. Initialize the set of eligible variables $E \leftarrow V \setminus T$
4. Repeat
5.     $Y \leftarrow \text{argmax}_{X \in E} \text{Association}(T, X)$
6.     $E \leftarrow E \setminus Y$
7.     If there is no subset $Z \subseteq M$ such that $T \perp Y \mid Z$ then
8.       $M \leftarrow M \cup Y$
9.     Else if $Z$ exists and the following relations hold: $T \not\perp Y$, $T \not\perp Z$, $T \perp Z \mid Y$
10.       Record in $\Theta$ that $Y$ and $Z$ contain equivalent information with respect to $T$
11. Until $E$ is empty

*Phase II: Backward*
12. For each $X \in M$
13.     If there is a subset $Z \subseteq M \setminus X$ such that $T \perp X \mid Z$ then
14.       $M \leftarrow M \setminus X$

*Phase III: Construction of multiple Markov boundaries*
15. Compute the Cartesian product of information equivalence relations for subsets of $M$ that are stored in $\Theta$ to construct multiple Markov boundaries of $T$
16. Output multiple Markov boundaries of $T$

Figure 1

Generalized-iTIE\*

Input: dataset D (a sample from distribution P) for variables $V$, including a response variable $T$.
Output: multiple Markov boundaries of $T$ that exist in P.

1. Initialization
   a. Initialize an equivalency catalogue $\Theta$ with known information equivalency relations with respect to $T$ or an empty set if no such relations are known
   b. Initialize a seed Markov boundary of $T$ to be: $M \leftarrow S$, s.t. $S \subseteq V \setminus T$
   c. Initialize a priority queue of variables to be examined for inclusion in $M$: OPEN $\leftarrow V \setminus (T \cup M)$ 2. Apply inclusion sub-process
   a. Prioritize variables in OPEN for inclusion in $M$;
   b. Throw away non-eligible variables from OPEN;
   c. Insert in $M$ the highest-priority variable(s) in OPEN and remove them from OPEN 3. Apply elimination/analysis sub-process to remove variables from $M$ and determine and record in the equivalency catalogue $\Theta$ which variable subsets contain equivalent information to the subsets of $M$ 4. Apply interleaving sub-process by repeating steps 2 and 3 until a termination criterion is met 5. Compute the Cartesian product of information equivalence relations for subsets of $M$ that are stored in $\Theta$ to construct multiple Markov boundaries of $T$
6. Output multiple Markov boundaries of $T$.

Figure 2

| Method | Parameterizations | References |
|---|---|---|
| NOVEL | | |
| iTIE* | • $\alpha = 0.05$, $max\text{-}k = 3$. | Novel method |
| STOCHASTIC MARKOV BOUNDARY DISCOVERY | | |
| KIAMB | • # of runs = 5,000, $\alpha = 0.05$, $K = 0.7$<br>• # of runs = 5,000, $\alpha = 0.05$, $K = 0.8$<br>• # of runs = 5,000, $\alpha = 0.05$, $K = 0.9$ | [11] |
| EGS-CMIM | • $l = 7$, $K = 10$     • $l = 5,000$, $K = 10$<br>• $l = 7$, $K = 50$     • $l = 5,000$, $K = 50$ | |
| EGS-NCMIGS | • $l = 7$, $\delta = 0.015$     • $l = 5,000$, $\delta = 0.015$<br>• $l = 7$, $K = 10$     • $l = 5,000$, $K = 10$<br>• $l = 7$, $K = 50$     • $l = 5,000$, $K = 50$ | [22] |
| VARIABLE GROUPING-BASED MARKOV BOUNDARY DISCOVERY | | |
| EGSG | • # of Markov boundaries = 30, $t = 15$     • # of Markov boundaries = 5,000, $t = 15$<br>• # of Markov boundaries = 30, $t = 10$     • # of Markov boundaries = 5,000, $t = 10$<br>• # of Markov boundaries = 30, $t = 5$     • # of Markov boundaries = 5,000, $t = 5$ | [23] |
| RESAMPLING-BASED VARIABLE SELECTION | | |
| Resampling+ RFE | • w/o statistical comparison of classification performance estimates<br>• with statistical comparison at significance level $\alpha = 0.05$<br>All configurations used 5,000 bootstrap samples and a reduction coefficient of 1.2. Statistical comparison of classification performance estimates was performed using permutation-based testing (with 10,000 permutations) for weighted accuracy [34] and DeLong's test [35] for AUC. | [19, 24-26] |
| Resampling+ UAF | • w/o statistical comparison of classification performance estimates<br>• with statistical comparison at significance level $\alpha = 0.05$<br>All configurations used 5,000 bootstrap samples and a reduction coefficient of 1.2. The same tests as in Resampling+RFE were used for statistical comparisons. | |
| ITERATIVE REMOVAL FOR VARIABLE SELECTION AND MARKOV BOUNDARY DISCOVERY | | |
| IR-HITON-PC | • $max\text{-}k = 3$, $\alpha = 0.05$<br>This method runs Semi-Interleaved HITON-PC without symmetry correction. The same tests as in Resampling+RFE were used for statistical comparisons. | [19, 27] |
| IR-SPLR | • w/o statistical comparison of classification performance estimates<br>• with statistical comparison at significance level $\alpha = 0.05$<br>The regularization coefficient $\lambda$ for each SPLR model was determined by holdout validation in training data. The same tests as in Resampling+RFE were used for statistical comparisons. | |

Figure 4

| Method | | I. Number of distinct MBs or VSs | II. Average size of extracted distinct MBs or VSs | III. Number of true MBs identified exactly | IV. Average proportion of false positives | V. Average false negative rate | VI. Weighted accuracy over all extracted MBs or VSs | |
|---|---|---|---|---|---|---|---|---|
| | | | | | | | Average | 95% Interval |
| iTIE* | max-k = 3, α = 0.05 | 72 | 5.0 | 72 | 0.000 | 0.000 | 0.951 | 0.938 0.965 |
| KIAMB | Number of runs = 5000, α = 0.05, K = 0.7 | 377 | 2.8 | 0 | 0.000 | 0.400 | 0.727 | 0.479 0.946 |
| | Number of runs = 5000, α = 0.05, K = 0.8 | 377 | 2.8 | 0 | 0.000 | 0.400 | 0.727 | 0.479 0.946 |
| | Number of runs = 5000, α = 0.05, K = 0.9 | 377 | 2.8 | 0 | 0.000 | 0.400 | 0.727 | 0.479 0.946 |
| EGS-NCMIGS | l = 7, δ = 0.015 | 6 | 7.0 | 0 | 0.286 | 0.000 | 0.964 | 0.963 0.965 |
| | l = 7, K = 10 | 6 | 10.0 | 0 | 0.500 | 0.000 | 0.964 | 0.963 0.965 |
| | l = 7, K = 50 | 6 | 21.0 | 0 | 0.762 | 0.000 | 0.941 | 0.937 0.943 |
| | l = 5000, δ = 0.015 | 24 | 7.3 | 0 | 0.469 | 0.267 | 0.954 | 0.843 0.967 |
| | l = 5000, K = 10 | 20 | 10.0 | 0 | 0.610 | 0.220 | 0.964 | 0.954 0.970 |
| | l = 5000, K = 50 | 9 | 21.0 | 0 | 0.762 | 0.000 | 0.944 | 0.937 0.954 |
| EGS-CMIM | l = 7, K = 10 | 6 | 10.0 | 0 | 0.500 | 0.000 | 0.963 | 0.963 0.965 |
| | l = 7, K = 50 | 6 | 21.0 | 0 | 0.762 | 0.000 | 0.939 | 0.937 0.942 |
| | l = 5000, K = 10 | 20 | 10.0 | 0 | 0.595 | 0.190 | 0.963 | 0.951 0.969 |
| | l = 5000, K = 50 | 9 | 21.0 | 0 | 0.762 | 0.000 | 0.943 | 0.937 0.954 |
| EGSG | Number of Markov boundaries = 30, t = 5 | 30 | 7.0 | 0 | 0.476 | 0.267 | 0.840 | 0.605 0.968 |
| | Number of Markov boundaries = 30, t = 10 | 30 | 7.0 | 0 | 0.548 | 0.367 | 0.722 | 0.379 0.962 |
| | Number of Markov boundaries = 30, t = 15 | 30 | 7.0 | 0 | 0.548 | 0.367 | 0.722 | 0.379 0.962 |
| | Number of Markov boundaries = 5,000, t = 5 | 1,997 | 7.0 | 0 | 0.286 | 0.000 | 0.863 | 0.620 0.965 |
| | Number of Markov boundaries = 5,000, t = 10 | 3,027 | 7.0 | 0 | 0.286 | 0.000 | 0.774 | 0.500 0.965 |
| | Number of Markov boundaries = 5,000, t = 15 | 3,027 | 7.0 | 0 | 0.286 | 0.000 | 0.774 | 0.500 0.965 |
| Resampling+RFE | without statistical comparison | 1,374 | 14.9 | 1 | 0.397 | 0.058 | 0.955 | 0.932 0.979 |
| | with statistical comparison (α = 0.05) | 188 | 4.9 | 0 | 0.171 | 0.378 | 0.930 | 0.917 0.967 |
| Resampling+UAF | without statistical comparison | 184 | 20.8 | 0 | 0.752 | 0.000 | 0.953 | 0.934 0.966 |
| | with statistical comparison (α = 0.05) | 19 | 8.4 | 0 | 0.592 | 0.347 | 0.930 | 0.917 0.938 |
| IR-HITON-PC | max-k = 3, α = 0.05 | 3 | 4.3 | 1 | 0.083 | 0.200 | 0.946 | 0.936 0.965 |
| IR-SPLR | without statistical comparison | 1 | 26.0 | 0 | 0.808 | 0.000 | 0.958 | 0.958 0.958 |
| | with statistical comparison (α = 0.05) | 1 | 17.0 | 0 | 0.706 | 0.000 | 0.959 | 0.959 0.959 |

Figure 6

| Method | | I. Number of distinct MBs or VSs | II. Average size of extracted distinct MBs or VSs | III. Number of true MBs identified exactly | IV. Average proportion of false positives | V. Average false negative rate | VI. Weighted accuracy over all extracted MBs or VSs | | |
|---|---|---|---|---|---|---|---|---|---|
| | | | | | | | Average | 95% Interval | |
| iTIE* | max-k = 3, α = 0.05 | 72 | 5.0 | 72 | 0.000 | 0.000 | 0.957 | 0.952 | 0.960 |
| KIAMB | Number of runs = 5000, α = 0.05, K = 0.7 | 349 | 2.8 | 0 | 0.000 | 0.400 | 0.722 | 0.450 | 0.959 |
| | Number of runs = 5000, α = 0.05, K = 0.8 | 349 | 2.8 | 0 | 0.000 | 0.400 | 0.722 | 0.450 | 0.959 |
| | Number of runs = 5000, α = 0.05, K = 0.9 | 349 | 2.8 | 0 | 0.000 | 0.400 | 0.722 | 0.450 | 0.959 |
| EGS-NCMIGS | l = 7, δ = 0.015 | 6 | 7.0 | 0 | 0.286 | 0.000 | 0.953 | 0.952 | 0.956 |
| | l = 7, K = 10 | 6 | 10.0 | 0 | 0.500 | 0.000 | 0.968 | 0.967 | 0.969 |
| | l = 7, K = 50 | 6 | 50.0 | 0 | 0.900 | 0.000 | 0.877 | 0.866 | 0.887 |
| | l = 5000, δ = 0.015 | 995 | 8.0 | 0 | 0.648 | 0.508 | 0.960 | 0.950 | 0.968 |
| | l = 5000, K = 10 | 990 | 10.0 | 0 | 0.747 | 0.494 | 0.961 | 0.952 | 0.968 |
| | l = 5000, K = 50 | 950 | 50.0 | 0 | 0.949 | 0.494 | 0.868 | 0.857 | 0.882 |
| EGS-CMIM | l = 7, K = 10 | 6 | 10.0 | 0 | 0.500 | 0.000 | 0.967 | 0.965 | 0.968 |
| | l = 7, K = 50 | 6 | 50.0 | 0 | 0.900 | 0.000 | 0.904 | 0.895 | 0.915 |
| | l = 5000, K = 10 | 990 | 10.0 | 0 | 0.676 | 0.353 | 0.961 | 0.953 | 0.967 |
| | l = 5000, K = 50 | 950 | 50.0 | 0 | 0.935 | 0.353 | 0.897 | 0.885 | 0.910 |
| EGSG | Number of Markov boundaries = 30, t = 5 | 30 | 67.0 | 0 | 0.958 | 0.440 | 0.688 | 0.383 | 0.850 |
| | Number of Markov boundaries = 30, t = 10 | 30 | 67.0 | 0 | 0.977 | 0.693 | 0.485 | 0.253 | 0.769 |
| | Number of Markov boundaries = 30, t = 15 | 30 | 67.0 | 0 | 0.984 | 0.780 | 0.422 | 0.246 | 0.739 |
| | Number of Markov boundaries = 5,000, t = 5 | 5,000 | 67.0 | 0 | 0.927 | 0.028 | 0.662 | 0.441 | 0.850 |
| | Number of Markov boundaries = 5,000, t = 10 | 5,000 | 67.0 | 0 | 0.944 | 0.250 | 0.476 | 0.248 | 0.780 |
| | Number of Markov boundaries = 5,000, t = 15 | 5,000 | 67.0 | 0 | 0.953 | 0.369 | 0.406 | 0.247 | 0.710 |
| Resampling+RFE | without statistical comparison | 2,492 | 16.7 | 2 | 0.434 | 0.039 | 0.951 | 0.931 | 0.968 |
| | with statistical comparison (α = 0.05) | 214 | 6.0 | 0 | 0.225 | 0.336 | 0.947 | 0.917 | 0.964 |
| Resampling+UAF | without statistical comparison | 1,207 | 28.7 | 0 | 0.721 | 0.000 | 0.952 | 0.935 | 0.964 |
| | with statistical comparison (α = 0.05) | 12 | 7.8 | 0 | 0.577 | 0.367 | 0.949 | 0.931 | 0.959 |
| IR-HITON-PC | max-k = 3, α = 0.05 | 2 | 5.0 | 1 | 0.100 | 0.100 | 0.958 | 0.958 | 0.959 |
| IR-SPLR | without statistical comparison | 1 | 30.0 | 0 | 0.833 | 0.000 | 0.949 | 0.949 | 0.949 |
| | with statistical comparison (α = 0.05) | 1 | 30.0 | 0 | 0.833 | 0.000 | 0.949 | 0.949 | 0.949 |

Figure 7

| Name | Domain | # of samples | # of variables | Response type | Data type | CV design | References |
|---|---|---|---|---|---|---|---|
| Infant_Mortality | Clinical | 5,337 | 86 | Death within the first year | Discrete | Holdout | [36] |
| Ohsumed | Text | 5,000 | 14,373 | Relevant to neonatal diseases | Continuous | Holdout | [37] |
| ACPJ_Etiology | Text | 15,779 | 28,228 | Relevant to etiology | Continuous | Holdout | [38] |
| Lymphoma | Gene Expression | 227 | 7,399 | 3-year survival: dead vs. alive | Continuous | 10-fold | [39] |
| Gisette | Digit recognition | 7,000 | 5,000 | 4 vs. 9 | Continuous | Holdout | NIPS 2003 Feature Selection Challenge [40] |
| Dexter | Text | 600 | 19,999 | Relevant to corporate acquisitions | Continuous | 10-fold | NIPS 2003 Feature Selection Challenge [40] |
| Sylva | Ecology | 14,394 | 216 | Ponderosa vs. rest | Continuous | Holdout | WCCI 2006 Perf. Prediction Challenge |
| Ovarian_Cancer | Proteomics | 216 | 2,190 | Cancer vs. normal | Continuous | 10-fold | [41] |
| Thrombin | Drug discovery | 2,543 | 139,351 | Binding to thrombin | Discrete | Holdout | KDD Cup 2001 |
| Breast_Cancer | Gene Expression | 286 | 17,816 | ER+ vs. ER- | Continuous | 10-fold | [42] |
| Hiva | Drug discovery | 4,229 | 1,617 | Activity to HIV AIDS infection | Discrete | Holdout | WCCI 2006 Perf. Prediction Challenge |
| Nova | Text | 1,929 | 16,969 | Political topics vs. religious | Discrete | Holdout | WCCI 2006 Perf. Prediction Challenge |
| Bankruptcy | Financial | 7,063 | 147 | Personal bankruptcy | Continuous | Holdout | [43] |

Figure 8

| Dataset | # MBs | Mean Size | AUC | St. Dev. | 95% Interval | |
|---|---|---|---|---|---|---|
| Infant_Mortality | 1 | 5 | 0.857 | 0.000 | 0.857 | 0.857 |
| Ohsumed | 48 | 35 | 0.773 | 0.003 | 0.768 | 0.778 |
| ACPJ_Etiology | 3 | 15 | 0.915 | 0.000 | 0.915 | 0.915 |
| Lymphoma | 2 | 16 | 0.624 | 0.114 | 0.419 | 0.826 |
| Gisette | 12 | 53 | 0.991 | 0.001 | 0.990 | 0.992 |
| Dexter | 1 | 18 | 0.965 | 0.016 | 0.941 | 0.984 |
| Sylva | 1 | 24 | 0.997 | 0.000 | 0.997 | 0.997 |
| Ovarian_Cancer | 1 | 7 | 0.975 | 0.032 | 0.880 | 1.000 |
| Thrombin | 1 | 13 | 0.844 | 0.000 | 0.844 | 0.844 |
| Breast_Cancer | 1 | 10 | 0.909 | 0.049 | 0.821 | 0.994 |
| Hiva | 192 | 7 | 0.703 | 0.017 | 0.681 | 0.739 |
| Nova | 5 | 41 | 0.925 | 0.000 | 0.925 | 0.925 |
| Bankruptcy | 1 | 10 | 0.907 | 0.000 | 0.907 | 0.907 |

Figure 9

| Method | | Rank | | |
|---|---|---|---|---|
| | | PV | AUC | (PV, AUC) |
| iTIE* | max-k = 3, α = 0.05 | 5 | 2 | 1 |
| KIAMB | Number of runs = 5000, α = 0.05, K = 0.7 | 2 | 4 | 5 |
| | Number of runs = 5000, α = 0.05, K = 0.8 | 2 | 4 | 5 |
| | Number of runs = 5000, α = 0.05, K = 0.9 | 2 | 4 | 5 |
| EGS-NCMIGS | l = 7, δ = 0.015 | 1 | 4 | 3 |
| | l = 7, K = 10 | 5 | 3 | 6 |
| | l = 7, K = 50 | 9 | 3 | 11 |
| | l = 5000, δ = 0.015 | 2 | 4 | 5 |
| | l = 5000, K = 10 | 4 | 3 | 4 |
| | l = 5000, K = 50 | 9 | 3 | 11 |
| EGS-CMIM | l = 7, K = 10 | 5 | 3 | 6 |
| | l = 7, K = 50 | 9 | 2 | 8 |
| | l = 5000, K = 10 | 3 | 3 | 2 |
| | l = 5000, K = 50 | 9 | 2 | 8 |
| EGSG | Number of Markov boundaries = 30, t = 5 | 6 | 4 | 10 |
| | Number of Markov boundaries = 30, t = 10 | 6 | 4 | 10 |
| | Number of Markov boundaries = 30, t = 15 | 6 | 5 | 13 |
| | Number of Markov boundaries = 5,000, t = 5 | 9 | 4 | 14 |
| | Number of Markov boundaries = 5,000, t = 10 | 8 | 4 | 12 |
| | Number of Markov boundaries = 5,000, t = 15 | 7 | 5 | 15 |
| Resampling+RFE | without statistical comparison | 10 | 2 | 9 |
| | with statistical comparison (α = 0.05) | 9 | 3 | 11 |
| Resampling+UAF | without statistical comparison | 11 | 1 | 7 |
| | with statistical comparison (α = 0.05) | 10 | 2 | 9 |
| IR-HITON-PC | max-k = 3, α = 0.05 | 5 | 3 | 6 |
| IR-SPLR | without statistical comparison | 10 | 2 | 9 |
| | with statistical comparison (α = 0.05) | 9 | 3 | 11 |

Figure 10

DATA ANALYSIS COMPUTER SYSTEM AND METHOD FOR FAST DISCOVERY OF MULTIPLE MARKOV BOUNDARIES

Benefit of U.S. Provisional Application No. 61/791,654 filed on Mar. 15, 2013 is hereby claimed.

BACKGROUND OF THE INVENTION

Field of Application

The field of application of the invention is data analysis especially as it applies to (so-called) "Big Data" (see sub-section 1 "Big Data and Big Data Analytics" below). The methods, systems and overall technology and knowhow needed to execute data analyses is referred to in the industry by the term data analytics. Data analytics is considered a key competency for modern firms [1]. Modern data analytics technology is ubiquitous (see sub-section 3 below "Specific examples of data analytics application areas"). Data analytics encompasses a multitude of processes, methods and functionality (see sub-section 2 below "Types of data analytics").

Data analytics cannot be performed effectively by humans alone due to the complexity of the tasks, the susceptibility of the human mind to various cognitive biases, and the volume and complexity of the data itself. Data analytics is especially useful and challenging when dealing with hard data/data analysis problems (which are often described by the term "Big Data"/"Big Data Analytics" (see sub-section 1 "Big Data and Big Data Analytics").

1. Big Data and Big Data Analytics
Big Data Analytics problems are often defined as the ones that involve Big Data Volume, Big Data Velocity, and/or Big Data Variation [2].

Big Data Volume may be due to large numbers of variables, or big numbers of observed instances (objects or units of analysis), or both.
  Big Data Velocity may be due to the speed via which data is produced (e.g., real time imaging or sensor data, or online digital content), or the high speed of analysis (e.g., real-time threat detection in defense applications, online fraud detection, digital advertising routing, high frequency trading, etc.).
  Big Data Variation refers to datasets and corresponding fields where the data elements, or units of observations can have large variability that makes analysis hard. For example, in medicine one variable (diagnosis) may take thousands of values that can further be organized in interrelated hierarchically organized disease types.

According to another definition, the aspect of data analysis that characterizes Big Data Analytics problems is its overall difficulty relative to current state of the art analytic capabilities. A broader definition of Big Data Analytics problems is thus adopted by some (e.g., the National Institutes of Health (NIH)), to denote all analysis situations that press the boundaries or exceed the capabilities of the current state of the art in analytics systems and technology. According to this definition, "hard" analytics problems are de facto part of Big Data Analytics [3].

2. Types of Data Analysis
The main types of data analytics [4] are:
  a. Classification for Diagnostic or Attribution Analysis: where a typically computer-implemented system produces a table of assignments of objects into predefined categories on the basis of object characteristics.
     Examples: medical diagnosis; email spam detection; separation of documents as responsive and unresponsive in litigation.
  b. Regression for Diagnostic Analysis: where a typically computer-implemented system produces a table of assignments of numerical values to objects on the basis of object characteristics.
     Examples: automated grading of essays; assignment of relevance scores to documents for information retrieval; assignment of probability of fraud to a pending credit card transaction.
  c. Classification for Predictive Modeling: where a typically computer-implemented system produces a table of assignments of objects into predefined categories on the basis of object characteristics and where values address future states (i.e., system predicts the future).
     Examples: expected medical outcome after hospitalization; classification of loan applications as risky or not with respect to possible future default; prediction of electoral results.
  d. Regression for Predictive Modeling: where a typically computer-implemented system produces a table of assignments of numerical values to objects on the basis of object characteristics and where values address future states (i.e., system predicts the future).
     Examples: predict stock prices at a future time; predict likelihood for rain tomorrow; predict likelihood for future default on a loan.
  e. Explanatory Analysis: where a typically computer-implemented system produces a table of effects of one or more factors on one or more attributes of interest; also producing a catalogue of patterns or rules of influences.
     Examples: analysis of the effects of sociodemographic features on medical service utilization, political party preferences or consumer behavior.
  f. Causal Analysis: where a typically computer-implemented system produces a table or graph of causes-effect relationships and corresponding strengths of causal influences describing thus how specific phenomena causally affect a system of interest.
     Example: causal graph models of how gene expression of thousands of genes interact and regulate development of disease or response to treatment; causal graph models of how socioeconomic factors and media exposure affect consumer propensity to buy certain products; systems that optimize the number of experiments needed to understand the causal structure of a system and manipulate it to desired states.
  g. Network Science Analysis: where a typically computer-implemented system produces a table or graph description of how entities in a mg system inter-relate and define higher level properties of the system.
     Example: network analysis of social networks that describes how persons interrelate and can detect who is married to whom; network analysis of airports that reveal how the airport system has points of vulnerability (i.e., hubs) that are responsible for the adaptive properties of the airport transportation system (e.g., ability to keep the system running by rerouting flights in case of an airport closure).
  h. Feature selection, dimensionality reduction and data compression: where a typically computer-implemented system selects and then eliminates all variables that are irrelevant or redundant to a classification/regression, or explanatory or causal modeling (feature selection) task;

or where such as system reduces a large number of variables to a small number of transformed variables that are necessary and sufficient for classification/regression, or explanatory or causal modeling (dimensionality reduction or data compression).

Example: in order to perform web classification into family-friendly ones or not, web site contents are first cleared of all words or content that is not necessary for the desired classification.

i. Subtype and data structure discovery: where analysis seeks to organize objects into groups with similar characteristics or discover other structure in the data.

Example: clustering of merchandize such that items grouped together are typically being bought together; grouping of customers into marketing segments with uniform buying behaviors.

j. Feature construction: where a typically computer-implemented system pre-processes and transforms variables in ways that enable the other goals of analysis. Such pre-processing may be grouping, abstracting, existing features or constructing new features that represent higher order relationships, interactions etc.

Example: when analyzing hospital data for predicting and explaining high-cost patients, co-morbidity variables are grouped in order to reduce the number of categories from thousands to a few dozen which then facilitates the main (predictive) analysis; in algorithmic trading, extracting trends out of individual time-stamped variables and replacing the original variables with trend information facilitates prediction of future stock prices.

k. Data and analysis parallelization, chunking, and distribution: where a typically computer-implemented system performs a variety of analyses (e.g., predictive modeling, diagnosis, causal analysis) using federated databases, parallel computer systems, and modularizes analysis in small manageable pieces, and assembles results into a coherent analysis.

Example: in a global analysis of human capital retention a world-wide conglomerate with 2,000 personnel databases in 50 countries across 1,000 subsidiaries, can obtain predictive models for retention applicable across the enterprise without having to create one big database for analysis.

3. Specific Examples of Data Analytics Application Areas

The following Listing provides examples of some of the major fields of application for the invented system specifically, and Data Analytics more broadly [5]:

1. Credit risk/Creditworthiness prediction.
2. Credit card and general fraud detection.
3. Intention and threat detection.
4. Sentiment analysis.
5. Information retrieval filtering, ranking, and search.
6. Email spam detection.
7. Network intrusion detection.
8. Web site classification and filtering.
9. Matchmaking.
10. Predict success of movies.
11. Police and national security applications
12. Predict outcomes of elections.
13. Predict prices or trends of stock markets.
14. Recommend purchases.
15. Online advertising.
16. Human Capital/Resources: recruitment, retention, task selection, compensation.
17. Research and Development.
18. Financial Performance.
19. Product and Service Quality.
20. Client management (selection, loyalty, service)
21. Product and service pricing.
22. Evaluate and predict academic performance and impact.
23. Litigation: predictive coding, outcome/cost/duration predition, bias of courts, voire dire.
24. Games (e.g., chess, backgammon, jeopardy).
25. Econometrics analysis.
26. University admissions modeling.
77. Mapping fields of activity.
28. Movie recommendations.
29. Analysis of promotion and tenure strategies,
30. intension detection and lie detection based on fMRI readings.
31. Dynamic Control (e.g., autonomous systems such as vehicles, missiles; industrial robots; prosthetic limbs).
32. Supply chain management.
33. Optimizing medical outcomes, safety, patient experience, cost, profit margin in healthcare systems.
34. Molecular profiling and sequencing based diagnostics, prognostics companion drugs and personalized medicine.
35. Medical diagnosis, prognosis and risk assessment
36. Automated grading of essays.
37. Detection of plagiarism.
38. Weather and other physical phenomena forecasting.

With regards to methods for Markov boundary discovery, they constitute one of the most important recent developments in pattern recognition and applied modeling, primarily because they offer a principled solution to the variable/feature selection problem and also give insight about local causal structure. The present invention is a novel fast method to discover multiple Markov boundaries of the response variable. The usefulness of the invention is first demonstrated in simulated data where the Markov boundaries of the response variable are known exactly. Then the usefulness of the invention is demonstrated with 13 real datasets from a diversity of application domains, where the invention can efficiently identify multiple Markov boundaries of the response variable. The resulting Markov boundaries can be used (a) to predict response variables of interest, (b) to develop highly compressed predictive models of the response variables, and (c) to understand what factors influence the response variables of interests and how to manipulate the system toward desired behaviors.

The invention can be applied to practically any field where discovery of causal or predictive models and/or feature selection is desired because it relies on extremely broad distributional assumptions that are valid in numerous fields. Because the discovery of Markov Boundaries also facilitates model conversion and explanation, inference and practically all aspects of data analytics, the invention is applicable and useful all the above mentioned types of data analysis and application areas.

DESCRIPTION OF RELATED ART

The problem of variable/feature selection is of fundamental importance in applied machine learning, especially when it comes to analysis, modeling, and discovery from high-dimensional datasets [6, 7]. In addition to the promise of cost-effectiveness (as a result of reducing the number of observed variables), two major goals of variable selection are to improve the predictive performance of classification/regression models and to provide a better understanding of the data-generative process [6]. A state of the art class of filter methods approaches the solution of the variable selection problem by identification of a Markov boundary of the response variable of interest [8-14]. The Markov boundary M is a minimal set of variables conditioned on which all the remaining variables in the dataset, excluding the response variable T, are rendered statistically independent of the response variable T. Under certain assumptions about the learner and the loss function, Markov boundary is the solution of the variable selection problem [12], i.e. it is the minimal set of variables with optimal predictive performance for the current distribution and response variable. Furthermore, in faithful distributions, Markov boundary corresponds to a local causal neighborhood of the response variable and consists of all its direct causes, effects, and causes of the direct effects [12, 15].

An important theoretical result states that if the distribution satisfies the intersection property, then it is guaranteed to have a unique Markov boundary of the response variable [16]. Faithful distributions, which constitute a subclass of distributions that satisfy the intersection property, also have a unique Markov boundary [12, 15]. However, some real-life distributions contain multiple Markov boundaries and thus violate the intersection property and faithfulness condition. For example, a phenomenon ubiquitous in analysis of high-throughput molecular data, known as the "multiplicity" of molecular signatures (i.e., different gene/biomarker sets perform equally well in terms of predictive accuracy of phenotypes) suggests existence of multiple Markov boundaries in these distributions [17-19]. Likewise, many engineering systems such as digital circuits and engines typically contain deterministic components and thus can lead to multiple Markov boundaries [20, 21].

Even though there are several well-developed methods for learning a single Markov boundary [8-14], little research has been done in development of methods for identification of multiple Markov boundaries. The most notable advances in the field are stochastic Markov boundary methods that involve running multiple times either a standard or approximate Markov boundary induction method initialized with a random seed, e.g. KIAMB [11], EGS-NCMIGS and EGS-CMIM [22]. Another approach exemplified in the EGSG method [A] involves first grouping variables into multiple clusters such that each cluster (i) has variables that are similar to each other and (ii) contributes "unique" information about the response variable, and then randomly sampling a representative from each cluster for the output Markov boundaries. In genomics data analysis, researchers try to induce multiple variable sets (that sometimes approximate Markov boundaries) via application of a standard variable selection method to resampled data, e.g., bootstrap samples [24-26]. Finally, other bioinformatics researchers proposed a multiple variable set selection method that iteratively applies a standard variable selection method after removing from the data all variables that participate in the previously discovered variable sets with optimal classification performance [27]. The above early approaches are either highly heuristic and/or cannot be practically used to induce multiple Markov boundaries in high-dimensional datasets with relatively small sample size.

BRIEF DESCRIPTION OF FIGURES

FIG. 1 describes a new method iTIE* for finding multiple Markov boundaries of the response variable from data.

FIG. 2 describes a new method Generalized-iTIE* for finding multiple Markov boundaries of the response variable from data.

FIG. 4 shows various methods used for discovery of multiple Markov boundaries and variable sets in the empirical evaluation. This figure also provides details about parameterizations of the methods. Parameter settings that have been recommended by the authors of prior methods are underlined.

FIG. 6 shows performance of various methods for discovery of multiple Markov boundaries and variable sets in the simulated dataset TIED. "MB" stands for "Markov boundary", and "VS" stands for "variable set". The 95% interval for weighted accuracy denotes the range in which weighted accuracies of 95% of the extracted Markov boundaries/variable sets fell. Classification performance of the MAP-BN classifier in the same data sample was 0.966 weighted accuracy. Highlighted in bold are results that are statistically comparable to the MAP-BN classification performance.

FIG. 7 shows performance of various methods for discovery of multiple Markov boundaries and variable sets in the simulated dataset TIED1000. "MB" stands for "Markov boundary", and "VS" stands for "variable set". The 95% interval for weighted accuracy denotes the range in which weighted accuracies of 95% of the extracted Markov boundaries/variable sets fell. Classification performance of the MAP-BN classifier in the same data sample was 0.966 weighted accuracy. Highlighted in bold are results that are statistically comparable to the MAP-BN classification performance.

FIG. 8 describes real datasets used for empirical evaluation of methods for discovery of multiple Markov boundaries and variable sets.

FIG. 9 reports performance of iTIE* in real datasets used for empirical evaluation.

FIG. 10 reports performance ranks of methods in real datasets according to various criteria discussed below (PV=proportion of variables, AUC=area under ROC curve) on average over all tested datasets. The smaller is rank the better is method.

DETAILED DESCRIPTION OF THE INVENTION

The inventive methods iTIE* and Generalized-iTIE* are shown in FIGS. 1 and 2, respectively. iTIE* is a configuration of the method Generalized-iTIE* which has the following inclusion sub-process in step 2:
  a) sort in descending order the variables in the priority queue according to their pairwise association with the response variable T;
  b) remove from the priority queue variables with zero association with the response variable T;
  c) insert in the seed Markov boundary M the highest-priority variable A in the priority queue and remove it from the priority queue;

the following elimination/analysis sub-process in step 3:
  a) if the priority queue is empty, then remove every member A of the seed Markov boundary M that is probabilistically independent of the response variable T given a subset B of the remaining variables in M;
  b) else if the priority queue is not empty, then if the last variable A that entered the seed Markov boundary M is probabilistically independent from the response variable T given a subset B of the rest of the variables in M, then remove A from M;
  c) If a variable A that has been removed from M in the above step b) because A is probabilistically independent of the response variable T given an subset B of M, record in the equivalency catalogue Θ that A and B contain equivalent information (with respect to T) if B is probabilistically independent of the response variable T given A;

its interleaving sub-process consists of repeating inclusion and elimination/analysis strategies until the priority queue is empty.

Figure 3:
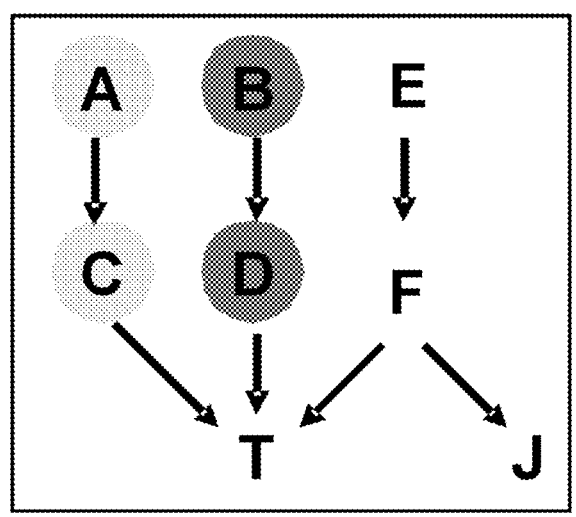
FIG. 3 shows a graph of a causal Bayesian network used to trace the iTIE* method. The response variable is T. All variables take values (0, 1). Variables A and C contain equivalent information about T and are highlighted with the same shade of grey. Likewise, variables B and D contain equivalent information about T and thus are also highlighted with the same shade of grey.

Consider running the iTIE* method on data D generated from the example causal Bayesian network shown in FIG. 3. The response variable T is directly caused by C, D, F. The underlying distribution is such that variables A and C contain equivalent information about T; likewise variables B and D contain equivalent information about T. iTIE*, when applied to data D would output correctly 4 Markov boundaries of T: (A, B, F), (A, D, F), (C, B, F), and (C, D, F).

In what follows, we present an empirical evaluation of methods for extraction of multiple Markov boundaries and variable sets. The evaluated methods and their parameterizations are shown in FIG. 4. These methods were chosen for our evaluation as they are the current state-of-the-art techniques for discovery of multiple Markov boundaries and variable sets.

All experiments involving assessment of classification performance were executed by holdout validation or cross-validation (see below), whereby Markov boundaries and variable sets are discovered in a training subset of data samples (training set), classification models based on the above variables are also developed in the training set, and the reported performance of classification models is estimated in an independent testing set. Assessment of classification performance of the extracted Markov boundaries and variable sets was done in the presented validation using Support Vector Machines (SVMs) [28]. We chose to use SVMs due to their excellent empirical performance across a wide range of application domains (especially with high-dimensional data and relatively small sample sizes), regularization capabilities, ability to learn both simple and complex classification functions, and tractable computational time [28-31]. When the response variable was multiclass, we applied SVMs in one-versus-rest fashion [30]. We used libSVM v.2.9.1 (http://www.csie.ntu.edu.tw/~cjlin/libsvm/) implementation of SVMs in all experiments [32]. Polynomial kernels were used in SVMs as they have shown good classification performance across the data domains considered in this study. The degree d of the polynomial kernel and the penalty parameter C of SVM were optimized by cross-validation on the training data. Each variable in a dataset was scaled to [0, 1] range to facilitate SVM training. The scaling constants were computed on the training set of samples and then applied to the entire dataset.

Below we present an evaluation of methods for extraction of multiple Markov boundaries and variable sets in simulated data. Simulated data allows us to evaluate methods in a controlled setting where the underlying causal process and all Markov boundaries of the response variable T are known exactly. Two datasets were used in this evaluation. One of these datasets, referred to as TIED, was previously used in an international causality challenge [33]. TIED contains 30 variables, including the response variable T. The underlying causal graph and its parameterization are given in [33] There are 72 distinct Markov boundaries of T. Each Markov boundary contains 5 variables: variable $X_{10}$ and one variable from each of the four subsets $(X_1, X_2, X_3, X_{11})$, $(X_5, X_9)$, $(X_{12}, X_{13}, X_{14})$ and $(X_{19}, X_{20}, X_{21})$. Another simulated dataset, referred to as TIED1000, contains 1,000 variables in total and was generated by the causal process of TIED augmented with an additional 970 variables that have no association with T. TIED1000 has the same set of Markov boundaries of T as TIED. TIED1000 allows us to study the behavior of different methods for learning multiple Markov boundaries and variable sets in an environment where the fraction of variables carrying relevant information about T is small.

For each of the two datasets, 750 observations were used for discovery of Markov boundaries/variable sets and training of the SVM classification models of the response variable T (with the goal to predict its values from the inferred Markov boundary variables), and an independent testing set of 3,000 observations was used for evaluation of the models' classification performance.

All methods for extracting multiple Markov boundaries and variable sets were assessed based on the following six performance criteria:
  I. The number of distinct Markov boundaries/variable sets output by the method.
  II. The average size of an output Markov boundary/variable set (number of variables).
  III. The number of true Markov boundaries identified exactly, i.e., without false positives and false negatives.
  IV. The average Proportion of False Positives (PFP) in the output Markov boundaries/variable sets.
  V. The average False Negative Rate (FNR) in the output Markov boundaries/variable sets.
  VI. The average SVM classification performance (weighted accuracy) over all output Markov boundaries/variable sets. We also compared the average classification performance of the SVM models with the maximum a posteriori classifier in the true Bayesian network (denoted as MAP-BN) using the same data sample.

Figure 5:
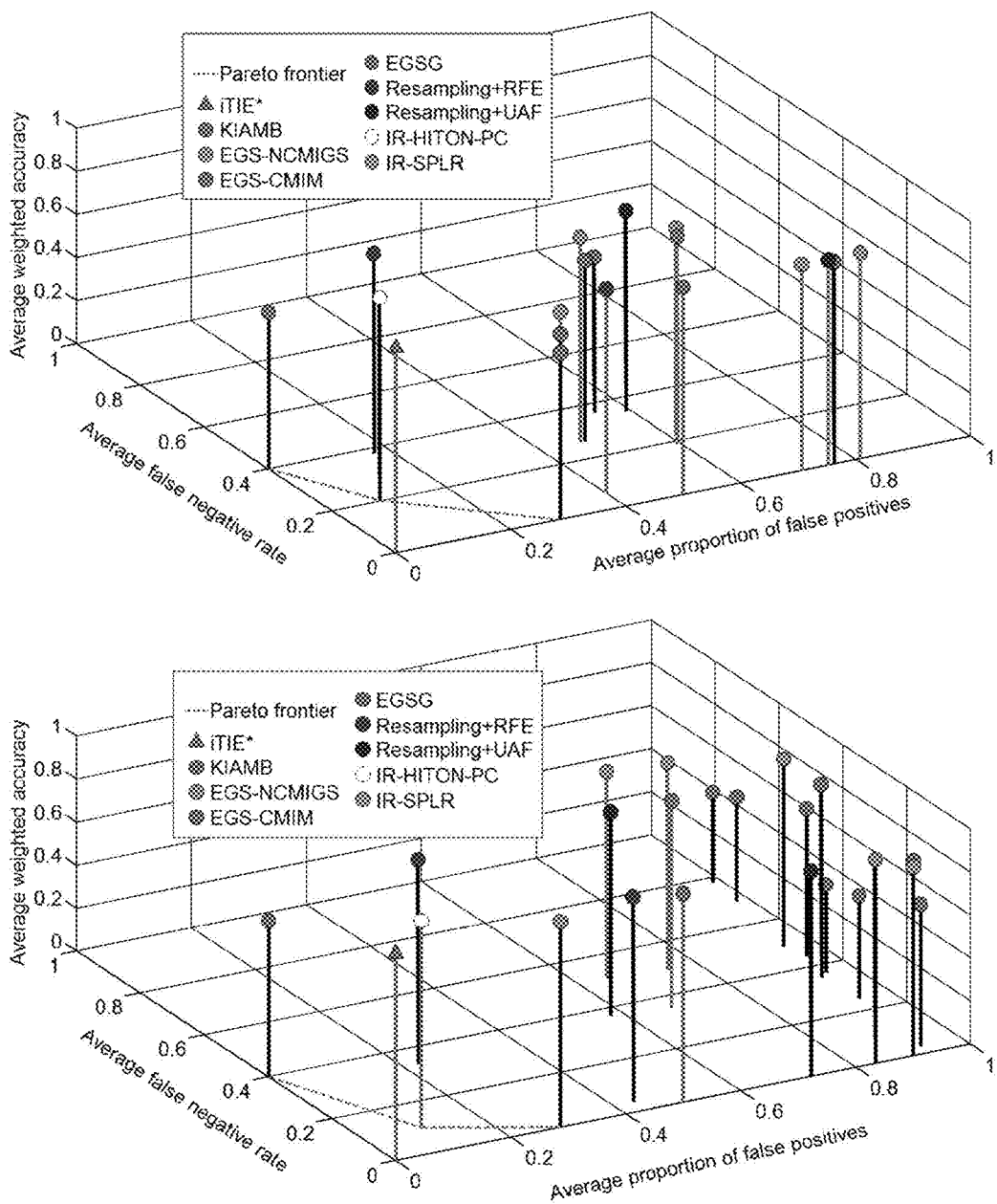
FIG. 5 shows results of iTIE* and other methods for discovery of multiple Markov boundaries and variable sets in datasets TIED (top figure) and TIED1000 (bottom figure). The figure shows results for average classification performance (weighted accuracy), average false negative rate, and average proportion of false positives. The color of a vertical line connecting each point with the plane shows whether the average SVM classification performance of a method is statistically comparable with the MAP-BN classifier in the same data sample (grey line) or not (black line). The Pareto frontier was constructed based on the average false negative rate and the average proportion of false positives over the comparator methods (i.e., non-iTIE*).

As can be seen in FIGS. 5-7, iTIE* identified exactly all and only true Markov boundaries of T in both simulated datasets, and their classification performance with the SVM classifier was statistically comparable to performance of the MAP-BN classifier. None of the comparator methods, regardless of the number of Markov boundaries/variable sets output, were able to identify exactly any of the 72 true Markov boundaries, except for Resampling+RFE (without statistical comparison) and IR-HITON-PC that identified exactly 1-2 out of 72 true Markov boundaries, depending on the dataset. Overall prior methods had either large proportion of false positives or large false negative rate, and often their classification performance was significantly worse that the performance of the MAP-BN classifier.

For evaluation of methods for learning multiple Markov boundaries and variable sets in real data, we used 13 datasets that cover a broad range of application domains (clinical outcome prediction, gene expression, proteomics, drug discovery, text categorization, digit recognition, ecology and finance), dimensionalities (from 86 to over 100,000), and sample sizes (from hundreds to thousands) that are representative of those appearing in practical applications. These datasets have recently been used in a broad benchmark [8] of the current state-of-the-art single Markov boundary induction and feature selection methods, which is another reason why we chose to use the same data in this study. The datasets are described in detail in FIG. 8. The datasets were preprocessed (imputed, discretized, etc.) as described in [8].

In datasets with relatively large sample sizes (>600), classification performance of the output Markov boundaries and variable sets was estimated by holdout validation with 75% of samples used for Markov boundary/variable set induction and SVM classifier training, and the remaining 25% of samples used for estimation of classification performance. In small-sample datasets, 10-fold cross-validation was used instead. Markov boundary/variable set induction and classifier training were both performed on the training sets from the 10-fold cross-validation design, with classification performance being subsequently estimated on the respective testing sets.

Evaluation of Markov boundary/variable selection methods in real data is challenging due to the lack of knowledge of the true Markov boundaries. In practical applications, however, the interest typically lies in the most compact subsets of variables that give the highest classification performance for reasonable and widely used classifiers [6]. This consideration motivated the following two primary evaluation criteria (with the averages taken over all Markov boundaries/variable sets output by each method):

I. The average Proportion of Variables (PV) in the output Markov boundaries/variable sets.
II. The average classification performance (AUC) of the output Markov boundaries/variable sets.

In addition to the above two primary criteria, in some problems we are also interested in extracting as many of the maximally compact and predictive variable sets (i.e., optimal solutions to the variable selection problem) as possible.

Detailed results of iTIE* are shown in FIG. 9 and comparison with other methods is given in FIG. 10. As can be seen, iTIE* extracted multiple compact Markov boundaries with high classification performance and surpassed all other methods on the combined (PV, AUC) criterion.

ABBREVIATIONS

AUC—Area under ROC curve (classification performance metric)
CV—Cross-validation (method for estimating classification performance)
EGS-CMIM—Ensemble gene selection with conditional mutual information maximization criterion (method for selecting multiple variable sets)
EGS-NCMIGS—Ensemble gene selection with normalized conditional mutual information gene selection (method for selecting multiple variable sets)
EGSG—Ensemble gene selection by grouping (method for selecting multiple variable sets)
FNR—False negative rate (Markov boundary discovery performance metric)
Generalized-iTIE*—Generalized individual target information equivalency (method for discovery of multiple Markov boundaries)
IR-HITON-PC—Iterative removal with HITON-PC (method for discovery of multiple Markov boundaries)
IR-SPLR—Iterative removal with sparse logistic regression (method for selecting multiple variable sets)
iTIE*—individual target information equivalency (method for discovery of multiple Markov boundaries)
KIAMB—K-incremental association Markov boundary (method for discovery of multiple Markov boundaries)
MAP-BN—Maximum a posteriori classification method in the true/data generating Bayesian network
MB—Markov boundary (variable set)
PFP—Proportion of false positives (Markov boundary discovery performance metric)
PV—Proportion of variables relative to the number of variables in the original dataset before variable selection
Resampling+RFE—Resampling followed by application of support vector machines-based recursive feature elimination (method for selecting multiple variable sets)
Resampling+UAF—Resampling followed by application of univariate attribute filtering (method for selecting multiple variable sets)
SVM—Support vector machines classification method
TIED—Target information equivalency dataset, original version
TIED1000—Target information equivalency dataset, version with 1,000 variables
VS—Variable set Method and System Output, Presentation, Storage, and Transmittance The relationships, correlations, and significance (thereof) discovered by application of the method of this invention may be output as graphic displays (multidimensional as required), probability plots, linkage/pathway maps, data tables, and other methods as are well known to those skilled in the art. For instance, the structured data stream of the method's output can be routed to a number of presentation, data/format conversion, data storage, and analysis devices including but not limited to the following: (a) electronic graphical displays such as CRT, LED, Plasma, and LCD screens capable of displaying text and images; (b) printed graphs, maps, plots, and reports produced by printer devices and printer control software; (c) electronic data files stored and manipulated in a general purpose digital computer or other device with data storage and/or processing capabilities; (d) digital or analog network connections capable of transmitting data; (e) electronic databases and file systems. The data output is transmitted or stored after data conversion and formatting steps appropriate for the receiving device have been executed.

Software and Hardware Implementation

Figure 11:
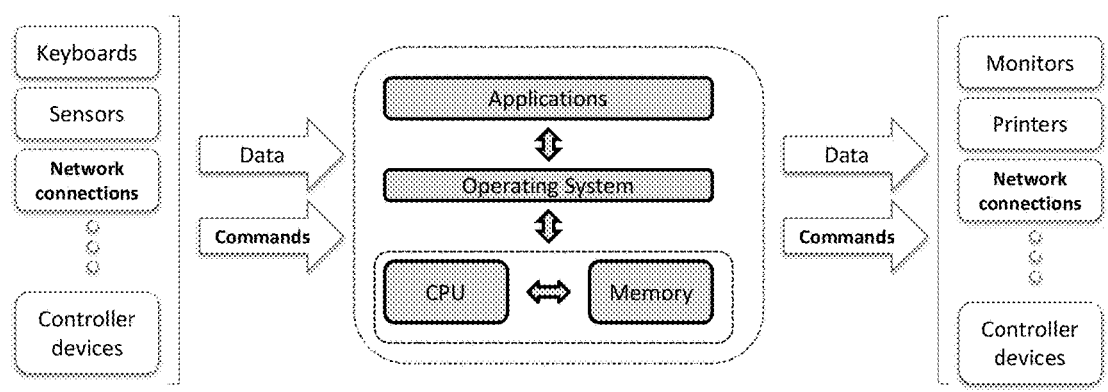
FIG. 11 shows the organization of a general-purpose modern digital computer system such as the ones used for the typical implementation of the invention.

Due to large numbers of data elements in the datasets, which the present invention is designed to analyze, the invention is best practiced by means of a general purpose digital computer with suitable software programming (i.e., hardware instruction set) (FIG. 11 describes the architecture of modern digital computer systems). Such computer systems are needed to handle the large datasets and to practice the method in realistic time frames. Based on the complete disclosure of the method in this patent document, software code to implement the invention may be written by those reasonably skilled in the software programming arts in any one of several standard programming languages including, but not limited to, C, Java, and Python. In addition, where applicable, appropriate commercially available software programs or routines may be incorporated. The software program may be stored on a computer readable medium and implemented on a single computer system or across a network of parallel or distributed computers linked to work as one. To implement parts of the software code, the inventors have used MathWorks Matlab® and a personal computer with an Intel Xeon CPU 2.4 GHz with 24 GB of RAM and 2 TB hard disk.

REFERENCES

1. Davenport T H, Harris J G: Competing on analytics: the new science of winning: Harvard Business Press; 2013.
2. Douglas L: The Importance of 'Big Data': A Definition. *Gartner* (June 2012) 2012.
3. NIH Big Data to Knowledge (BD2K) [http://bd2k.nih.gov/about_bd2k.html#bigdata]
4. Provost F, Fawcett T: Data Science for Business: What you need to know about data mining and data-analytic thinking: "O'Reilly Media, Inc."; 2013.
5. Siegel E: Predictive Analytics: The Power to Predict Who Will Click, Buy, Lie, or Die: John Wiley & Sons; 2013.
6. Guyon I, Elisseeff A: An introduction to variable and feature selection. *Journal of Machine Learning Research* 2003, 3(1):1157-1182.
7. Kohavi R, John G H: Wrappers for feature subset selection. *Artificial Intelligence* 1997, 97(1-2):273-324.
8. Aliferis C F, Statnikov A, Tsamardinos I, Mani S, Koutsoukos X D: Local Causal and Markov Blanket Induction for Causal Discovery and Feature Selection for Classification. Part I: Algorithms and Empirical Evaluation. *Journal of Machine Learning Research* 2010, 11:171-234.
9. Aliferis C F, Tsamardinos I, Statnikov A: HITON: a novel Markov blanket algorithm for optimal variable selection. *AMIA* 2003 *Annual Symposium Proceedings* 2003: 21-25.
10. Mani S, Cooper G F: Causal discovery using a Bayesian local causal discovery algorithm. *Medinfo* 2004 2004, 11(Pt 1):731-735.
11. Pena J, Nilsson R, Bj"rkegren J, Tegn, r J: Towards scalable and data efficient learning of Markov boundaries. *International Journal of Approximate Reasoning* 2007, 45(2): 211-232.
12. Tsamardinos I, Aliferis C F: Towards principled feature selection: relevancy, filters and wrappers. *Proceedings of the Ninth International Workshop on Artificial Intelligence and Statistics (AI & Stats)* 2003.
13. Tsamardinos I, Aliferis C F, Statnikov A: Time and sample efficient discovery of Markov blankets and direct causal relations. *Proceedings of the Ninth International Conference on Knowledge Discovery and Data Mining (KDD)* 2003:673-678.
14. Tsamardinos I, Aliferis C F, Statnikov A: Algorithms for large scale Markov blanket discovery. *Proceedings of the Sixteenth International Florida Artificial Intelligence Research Society Conference (FLAIRS)* 2003:376-381.
15. Neapolitan R E: Learning Bayesian networks. Upper Saddle River, N.J.: Pearson Prentice Hall; 2004.
16. Pearl J: Probabilistic reasoning in intelligent systems: networks of plausible inference. San Mateo, Calif.: Morgan Kaufmann Publishers; 1988.
17. Dougherty E, Brun M: On the number of close-to-optimal feature sets. *Cancer Informatics* 2006, 2:189-196.
18. Somorjai R L, Dolenko B, Baumgartner R: Class prediction and discovery using gene microarray and proteomics mass spectroscopy data: curses, caveats, cautions. *Bioinformatics* 2003, 19(12):1484-1491.
19. Statnikov A, Aliferis C F: Analysis and Computational Dissection of Molecular Signature Multiplicity. *PLoS Computational Biology* 2010, 6(5):e1000790.
20. Gopnik A, Schulz L: Causal learning: psychology, philosophy, and computation. Oxford: Oxford University Press; 2007.
21. Lemeire J: Learning Causal Models of Multivariate Systems and the Value of it for the Performance Modeling of Computer Programs. Ph.D. Thesis, Vrije Universiteit Brussel, Faculty of Engineering, Department of Electronics and Informatics; 2007.
22. Liu H, Liu L, Zhang H: Ensemble gene selection for cancer classification. *Pattern Recognition* 2010, 43(8): 2763-2772.
23. Liu H, Liu L, Zhang H: Ensemble gene selection by grouping for microarray data classification. *J Biomed Inform* 2010, 43(1):81-87.
24. Ein-Dor L, Kela I, Getz G, Givol D, Domany E: Outcome signature genes in breast cancer: is there a unique set? *Bioinformatics* 2005, 21(2):171-178.
25. Michiels S, Koscielny S, Hill C: Prediction of cancer outcome with microarrays: a multiple random validation strategy. *Lancet* 2005, 365(9458):488-492.
26. Roepman P, Kemmeren P, Wessels L F, Slootweg P J, Holstege F C: Multiple robust signatures for detecting lymph node metastasis in head and neck cancer. *Cancer Res* 2006, 66(4):2361-2366.
27. Natsoulis G, El G L, Lanckriet G R, Tolley A M, Leroy F, Dunlea S, Eynon B P, Pearson C I, Tugendreich S, Jarnagin K: Classification of a large microarray data set: algorithm comparison and analysis of drug signatures. *Genome Res* 2005, 15(5):724-736.
28. Vapnik V N: Statistical learning theory. New York: Wiley; 1998.
29. Cristianini N, Shawe-Taylor J: An introduction to support vector machines and other kernel-based learning methods. Cambridge: Cambridge University Press; 2000.
30. Scholkopf B, Burges C J C, Smola A J: Advances in kernel methods: support vector learning. Cambridge, Mass.: MIT Press; 1999.
31. Shawe-Taylor J, Cristianini N: Kernel methods for pattern analysis. Cambridge, UK: Cambridge University Press; 2004.
32. Fan R E, Chen P H, Lin C J: Working set selection using second order information for training support vector machines. *Journal of Machine Learning Research* 2005, 6(1889):1918.
33. Statnikov A, Aliferis C F: TIED: An Artificially Simulated Dataset with Multiple Markov Boundaries. *Journal of Machine Learning Research Workshop and Conference Proceedings, Volume 6: Causality: Objectives and Assessment (NIPS 2008)* 2010, 6:249-256.
34. Good P I: Permutation tests: a practical guide to resampling methods for testing hypotheses, vol. 2nd. New York: Springer; 2000.
35. DeLong E R, DeLong D M, Clarke-Pearson D L: Comparing the areas under two or more correlated 36. Mani S, Cooper G F: A Study in Causal Discovery from Population-Based Infant Birth and Death Records. *Proceedings of the AMIA Annual Fall Symposium* 1999, 319.
37. Joachims T: Learning to classify text using support vector machines. Boston: Kluwer Academic Publishers; 2002.
38. Aphinyanaphongs Y, Tsamardinos I, Statnikov A, Hardin D, Aliferis C F: Text categorization models for high-quality article retrieval in internal medicine. *J Am Med Inform Assoc* 2005, 12(2):207-216.
39. Rosenwald A, Wright G, Chan W C, Connors J M, Campo E, Fisher R I, Gascoyne R D, Muller-Hermelink H K, Smeland E B, Giltnane J M et al: The use of molecular profiling to predict survival after chemotherapy for diffuse large-B-cell lymphoma. *N Engl J Med* 2002, 346(25):1937-1947.
40. Guyon I, Gunn S, Nikravesh M, Zadeh L A: Feature extraction: foundations and applications. Berlin: Springer-Verlag; 2006.
41. Conrads T P, Fusaro V A, Ross S, Johann D, Rajapakse V, Hitt B A, Steinberg S M, Kohn E C, Fishman D A, Whitely G et al: High-resolution serum proteomic features for ovarian cancer detection. *Endocr Relat Cancer* 2004, 11(2):163-178.
42. Wang Y, Klijn J G, Zhang Y, Sieuwerts A M, Look M P, Yang F, Talantov D, Timmermans M, Meijer-van Gelder M E, Yu J et al: Gene-expression profiles to predict distant metastasis of lymph-node-negative primary breast cancer. *Lancet* 2005, 365(9460):671-679.
43. Foster D P, Stine R A: Variable Selection in Data Mining: Building a Predictive Model for Bankruptcy. *Journal of the American Statistical Association* 2004, 99(466):303-314.

We claim:

1. A computer-implemented method and system for determining and extracting multiple Markov boundaries of the response variable T from a dataset comprising the following steps:
   1) finding a "seed" Markov boundary list of variables M of the response variable T and then determining and outputting an equivalency catalogue $\Theta$ which lists variable subsets that contain equivalent information (with respect to T) to the subsets of variables in M using the following steps:
      a) initializing an equivalency catalogue $\Theta$ to known information equivalency relations with respect to T or an empty set if no such relations are known;
      b) initializing a seed Markov boundary M to be a subset of all variables minus the response variable T;
      c) initializing a priority queue of variables to be examined for inclusion in the seed Markov boundary M from the remaining variables;
      d) applying a computer-implemented inclusion sub-process for:
         i. prioritizing variables in the priority queue for inclusion in the seed Markov boundary M;
         ii. removing non-eligible variables from the priority queue;
         iii. inserting in the seed Markov boundary M the highest-priority variable(s) in the priority queue and then removing them from the priority queue;
      e) applying a computer-implemented elimination/analysis sub-process to remove variables from the seed Markov boundary M and determining and recording in the equivalency catalogue $\Theta$ which variable subsets contain equivalent information to the subsets of M;
      f) iterating steps 1.d) and 1.e) according to a computer-implemented interleaving sub-process until a termination criterion is met providing that variables may be re-ranked after each update of the seed Markov boundary M or the original ranking may be used throughout the method's operation;
   2) constructing multiple Markov boundaries of the response variable T by iterating through all variable subsets A of the seed Markov boundary M and substituting them with all variable subsets B that contain equivalent information to A and have been recorded in the equivalency catalogue $\Theta$; and
   3) outputting the seed Markov boundary M and all multiple Markov boundaries of the response variable T contained in the equivalency catalogue $\Theta$ as identified in step 2).

2. The computer-implemented method and system of claim 1 in which:
   a) step 1.d) applying a computer-implemented inclusion sub-process that satisfies the following operating characteristics:
      (i) all variables that are members of all Markov boundaries of the response variable T are eligible for inclusion in the seed Markov boundary list M, and each such variable is assigned a non-zero priority value by the inclusion process prioritization ranking;
      (ii) variables with zero inclusion priority values are discarded and never considered again;
   b) step 1.e) applying a computer-implemented elimination/analysis sub-process that satisfies the following operating characteristics:
      (i) all and only variables that are probabilistically independent of the response variable T given any subset of the seed Markov boundary M, are discarded and never considered again (whether they are inside or outside the seed Markov boundary M);
      (ii) recording in the equivalency catalogue $\Theta$ that subsets of variables A and B contain equivalent information (with respect to T) if the following four conditions hold:
         i. a subset of variables A is probabilistically independent of the response variable T given some subset B of the seed Markov boundary M;
         ii. B is probabilistically independent of the response variable T given A;
         iii. A is not probabilistically independent of T (i.e., it is associated with T);
         iv. B is not probabilistically independent of T (i.e., it is associated with T); and
   c) step 1.f) applying a computer-implemented interleaving sub-process that iterates the inclusion and elimination sub-processes any number of times provided that iterating stops when the following criterion is satisfied: at termination no variable outside the seed Markov boundary M is eligible for inclusion and no variable in M can be removed at termination.

3. The computer-implemented method and system of claim 1 in which step 1.d) applies the inclusion sub-process implemented in the following manner:
   a) using randomized computerized search over values of standard heuristic functions in the field of feature selection employing univariate association, or similarity, or regression coefficients or other equivalent functions;

b) using the observed probability of a variable to remain in the seed Markov boundary after conditioning on many subsets of variables; and c) using application-specific structure of the data generating process and/or application-specific distributional characteristics.

4. A computer-implemented method and system for determining and extracting multiple Markov boundaries of the response variable T from a dataset comprising the following steps:

1) finding a seed Markov boundary list of variables M of the response variable T and determining and recording in an equivalency catalogue Θ which variable subsets contain equivalent information (with respect to T) to the subsets of variables in M using the following steps:
   a) initializing an equivalency catalogue Θ to be empty;
   b) initializing a seed Markov boundary list M to be empty;
   c) initializing a priority queue of variables to be examined for inclusion in the seed Markov boundary M from the remaining variables;
   d) applying the following computer implemented inclusion sub-process:
      i. sorting in descending order the variables in the priority queue according to their pairwise association with the response variable T;
      ii. removing from the priority queue variables with zero association with the response variable T;
      iii. inserting in the seed Markov boundary M the highest-priority variable A in the priority queue and removing it from the priority queue;
   e) applying the following computer implemented elimination/analysis sub-process:
      i. if the priority queue is empty, then removing every member A of the seed Markov boundary M that is probabilistically independent of the response variable T given a subset B of the remaining variables in M;
      ii. if the priority queue is not empty, then if the last variable A that entered the seed Markov boundary M is probabilistically independent from the response variable T given a subset B of the rest of the variables in M, then removing A from M;
      iii. if a variable A that has been removed from M in the above step 1.e.ii) because A is probabilistically independent of the response variable T given a subset B of M, then recording in the equivalency catalogue Θ that A and B contain equivalent information (with respect to T) if B is probabilistically independent of the response variable T given A;
   f) applying the following computer implemented interleaving sub-process by iterating steps 1.d) and 1.e) until the priority queue is empty;

2) constructing the list of all Markov boundaries of the response variable T by iterating through all variable subsets A of the seed Markov boundary M and substituting them with all variable subsets B that contain equivalent information to A and have been recorded in the equivalency catalogue Θ; and 3) outputting the seed Markov boundary M and all multiple Markov boundaries of the response variable T contained in the equivalency catalogue Θ as identified in step 2).

5. A method of determining within a dataset the smallest subsets of the dataset that are fully representative of the entire dataset with respect to a variable T of interest by employing a computer-implemented method and system for determining and extracting multiple Markov boundaries of the response variable T from a dataset comprising the following steps:

4) finding a "seed" Markov boundary list of variables M of the response variable T and then determining and outputting an equivalency catalogue Θ which lists variable subsets that contain equivalent information (with respect to T) to the subsets of variables in M using the following steps:
   g) initializing an equivalency catalogue Θ to known information equivalency relations with respect to T or an empty set if no such relations are known;
   h) initializing a seed Markov boundary M to be a subset of all variables minus the response variable T;
   i) initializing a priority queue of variables to be examined for inclusion in the seed Markov boundary M from the remaining variables;
   j) applying a computer-implemented inclusion sub-process for:
      iv. prioritizing variables in the priority queue for inclusion in the seed Markov boundary M;
      v. removing non-eligible variables from the priority queue;
      vi. inserting in the seed Markov boundary M the highest-priority variable(s) in the priority queue and then removing them from the priority queue;
   k) applying a computer-implemented elimination/analysis sub-process to remove variables from the seed Markov boundary M and determining and recording in the equivalency catalogue Θ which variable subsets contain equivalent information to the subsets of M;
   l) iterating steps 1.d) and 1.e) according to a computer-implemented interleaving sub-process until a termination criterion is met providing that variables may be re-ranked after each update of the seed Markov boundary M, or the original ranking may be used throughout the method's operation;

5) constructing multiple Markov boundaries of the response variable T by iterating through all variable subsets A of the seed Markov boundary M and substituting them with all variable subsets B that contain equivalent information to A and have been recorded in the equivalency catalogue Θ; and 4) outputting the seed Markov boundary M and all multiple Markov boundaries of the response variable T contained in the equivalency catalogue Θ as identified in step 2) wherein the seed Markov boundary and all multiple Markov boundaries are fully representative of the entire dataset with respect to a variable T.

* * * * *